United States Patent [19]

Macachor

[11] Patent Number: 4,809,457
[45] Date of Patent: Mar. 7, 1989

[54] FISHING LINE RELEASE DEVICE

[76] Inventor: Jesus D. Macachor, 4445 S. Oakwood Terr., New Berlin, Wis. 53151

[21] Appl. No.: 198,331

[22] Filed: May 25, 1988

[51] Int. Cl.$^4$ ............................................. A01K 91/00
[52] U.S. Cl. ..................................................... 43/43.12
[58] Field of Search .................... 43/43.12, 27.4, 44.88

[56] References Cited

U.S. PATENT DOCUMENTS

| | | | |
|---|---|---|---|
| 2,858,637 | 11/1958 | Stark | 43/43.12 |
| 3,081,575 | 3/1968 | Meisner | 43/43.12 |
| 3,659,370 | 5/1972 | Ritter | 43/43.12 |
| 3,765,118 | 10/1973 | Reitler | 43/43.12 |
| 3,874,110 | 4/1975 | Larson | 43/43.12 |
| 3,925,920 | 12/1975 | Walker | 43/43.12 |
| 4,031,652 | 6/1977 | Johnson | 43/43.12 |
| 4,069,611 | 1/1978 | Dusich | 43/43.12 |
| 4,177,599 | 12/1979 | Pettersen | 43/43.12 |
| 4,261,130 | 4/1981 | Cudnohufsky | 43/43.12 |
| 4,417,414 | 11/1983 | Hood | 43/43.12 |
| 4,430,823 | 2/1984 | Henze | 43/43.12 |
| 4,656,776 | 4/1987 | Macachor | 43/43.12 |

Primary Examiner—Gene P. Crosby
Attorney, Agent, or Firm—Fred Wiviott

[57] ABSTRACT

A fishing line release device includes a body adapted to be attached to a downrigger line and having a first guide adjacent one end of the body and a second guide axially disposed relative to the one end of the body for receiving the fishing line therethrough. Projections are disposed adjacent the one body end and about which the fishing line can be wound. A first magnetic member is positioned along the body and defines a path extending toward and away from the projections and a release lever assembly is pivotly mounted on the body adjacent the one end and is constructed and arranged such that when the lever assembly is in an unpivoted position a lever arm extends in a direction parallel to the path. A hook is formed on the lever arm adjacent the projections to hold the fishing line thereon and whereby a force on the fishing line tends to pivot the lever arm to move the hook to a release position thereby releasing said fishing line. A second magnetic member is slidably mounted on the lever arm and is attracted to the first magnetic member for resisting pivotable movement of the lever arm so that the degree of force required to release the fishing line is dependent upon the position of the first magnetic member along the path.

7 Claims, 1 Drawing Sheet

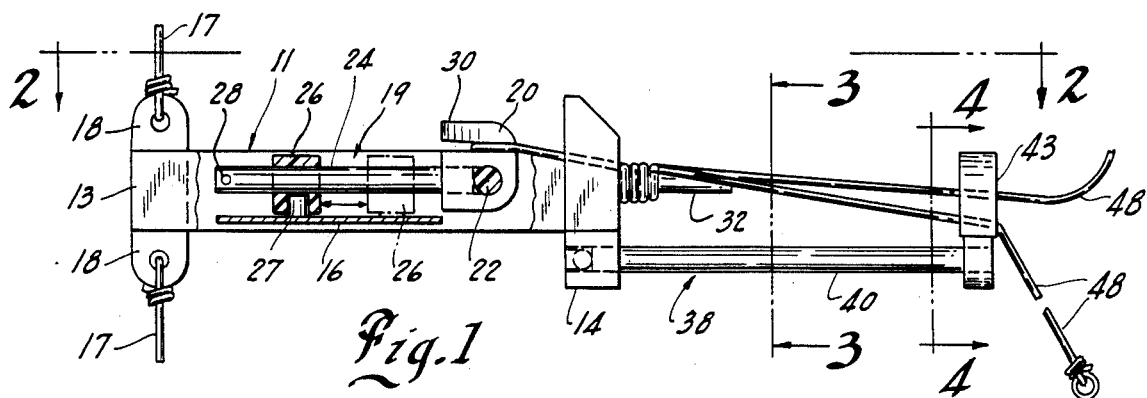
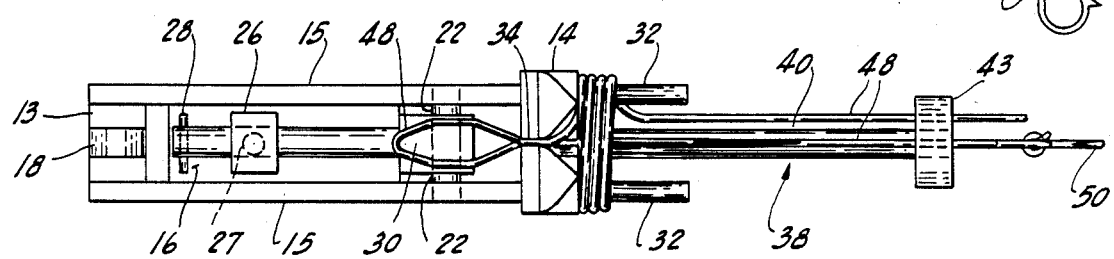
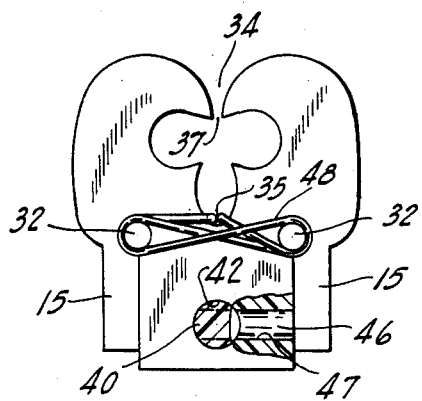
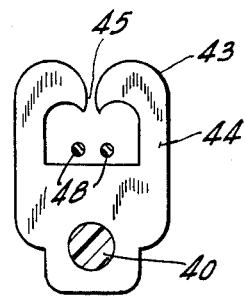
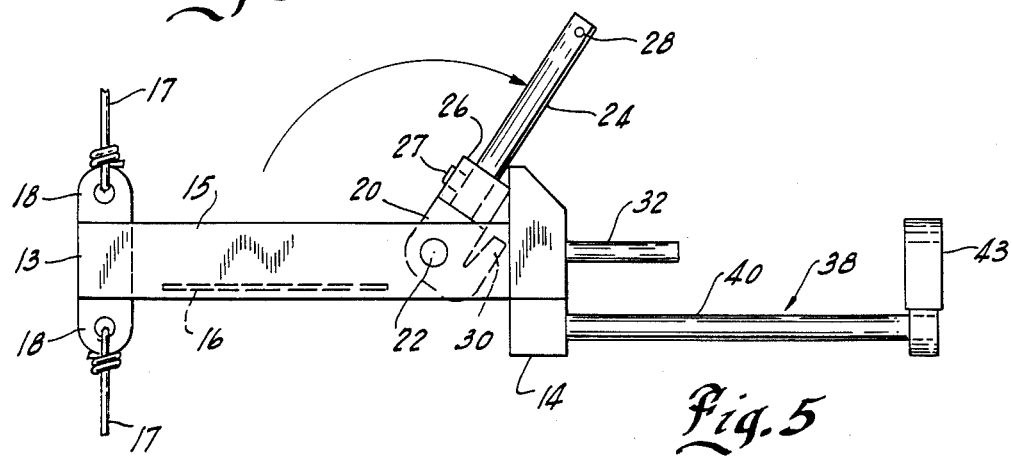

FISHING LINE RELEASE DEVICE

BACKGROUND OF THE INVENTION

This invention relates to a downrigger release mechanism.

In one fishing technique called trolling, the fishing line is pulled behind a slowly moving boat. Because the forward movement of the boat tends to cause the relatively light fishing line, lure and hook to rise in the water, a device called a downrigger is employed to maintain the hook and lure at the desired depth for the type of fish being sought. Downriggers generally consist of a weighted line to which the fishing line is coupled by a mechanism which releases a fishing line when a fish takes the baited hook.

Various types of downrigger release mechanisims have been employed. For example, in one type of device the fishing line is wrapped around a first element which is frictionally held by a second element secured to the downrigger line. The fishing line is released when sufficient force is applied to separate the elements. This type of release device is shown, for example, in U.S. Pat. Nos. 3,765,118; 4,069,611; and 4,177,599.

Another type of prior art device holds the fishing line to the downrigger line by means of a spring and retaining element. The fishing line is released when a fish exerts sufficent pull to overcome the retaining spring. Release elements of this type are shown, for example, in U.S. Pat. Nos. 2,858,637; 3,659,370; and 3,925,920.

These prior art release devices have not been entirely satisfactory because they tend to abrade or kink the fishing line. Another shortcoming of such devices is that the required release force cannot be readily adjusted for the requirements of different species of fish.

One attempt to overcome these shortcomings is disclosed in U.S. Pat. No. 4,031,652. This device employs an adjustable magnet attached to the downrigger line and a magnetic member mounted on the fishing line. By adjusting the position of the magnet, the degree of magnetic attraction between the magnet and the magnetic member can be controlled. While this device does permit some adjustment of the required release force, the magnetic member remains attached to the fishing line after release thereby creating a drag which might be sensed by some fish causing them to release the hook. Additionally, the removable release member could become lost if the line parts or if it slides off the end of line.

Another prior art release device is disclosed in U.S. Pat. No. 4,656,776 which discloses a release device having a pivoting fishing line release lever and an adjustable magnetic coupler so that the force required to release the fishing line can be adjusted. This prior art release device, while overcoming some of the shortcomings of earlier devices, is not wholly satisfactory because it tended to jam when the fish swam beneath the release device and backwardly toward the heavier weighted line.

SUMMARY OF THE INVENTION

It is an object of the invention to provide a new and improved downrigger release device.

Another object of the invention is to provide a downrigger release device which does not tangle, abrade or kink the fishing line.

A further object of the invention is to provide a downrigger release having no parts which separable during operation.

Yet another object of the invention is to provide a downrigger release device which may be adjusted for requirements of different fish.

A still further object of the invention is to provide a downrigger release device which minimizes jamming of the fishing line.

In general terms, the invention comprises a downrigger release comprising a body adapted to be attached to an outrigger line and including fishing line receiving means at one end about which a fishing line can be wound, first magnetic means mounted on the body and defining a path extending generally toward and away from the fishing line receiving means, lever means pivotly mounted on the body and having pivoted and unpivoted positions. The lever means includes a first portion extending in a direction generally parallel to the path and a second portion positioned adjacent to the fishing line receiving means, a second magnetic means mounted on the first lever portion for movement to positons thereon adjacent the first magnetic means whereby the magnetic attraction between said magnetic means must be over come to pivot the lever means away from its unpivoted position to its pivoted position with the force required to pivot said lever means being directly related to the position of the second magnetic means along the path so that the pull required to pivot said lever means and thereby release said fishing line can be adjusted for the requirements of different fish. Guide means is mounted on the body and extends in a direction opposite to that of the lever means and having a guide portion at one end for receiving said fishing line thereon so that the line will not jam on the fishing line receiving means.

BRIEF DESCRIPTION OF THE DRAWINGS

FIG. 1 is a side elevational view, with parts broken away, of the downrigger release mechanism in accordance with the preferred embodiment ot the invention;

FIG. 2 is a top plan view of the downrigger release mechanism shown in FIG. 1;

FIG. 3 is a view taken along lines 3—3 of FIG. 1;

FIG. 4 is a view taken along lines 4—4 of FIG. 1; and

FIG. 5 shows the mechanism of FIG. 1 in its position after release of the fishing line.

DETAILED DESCRIPTION OF THE PREFERRED EMBODIMENT

The downrigger release 10 according to the preferred embodiment of the invention includes an elongated body 11 having end members 13 and 14, a pair of elongated side members 15, and a bottom plate 16 formed of a magnetic material, such as stainless steel. Body 11 may be attached to a downrigger line 17 in any suitable manner, such as by means of mounting arms 18 extending laterally from end member 13.

A lever assembly 19 includes a trigger 20 pivotly mounted by means of a pair of trunnions 22 between the side members 15. An elongate lever arm 24 extends from one side of the head portion 20 and in a direction generally perpendicular to the axes of the trunnion pins 22. Slidably mounted on lever arm 24 is a carrier 26 having a permanent magnet 27 mounted at one side for being attracted to the plate 16 of magnetic material. The carrier 26 is retained on the arm 24 by means of a retaining pin 28 at its remote end. In addition, the trigger 20 of lever assembly 19 has a notch 30 formed in its upper end and facing rearwardly toward the lever arm 24.

Extending forwardly from the upper portion of end member 14 and in a generally parallel, spaced apart relation, are a pair of pins 32. The spacing of the pins 32 is about equal to the width of the housing 11. Formed in the end member 14 between the pins 32 is a tapered entrance slot 34 extending downwardly from its upper edge and connected at its lower end to a clover leaf shaped recess 35.

Also mounted in the end member 14 below the pins 32 is a guide assembly 38. In particular, guide assembly 38 includes an elongate, rod-like carrier 40 which is slidably received in an opening 42 formed in end member 14 below recess 35 and in general parallelism with the pins 32. At the remote end of the carrier 40 is a guide member 43 having a shaped recess 44 formed therein. The upper end of recess 44 communicates with a slit 45 which tapers inwardly from its upper to its lower end. A cross pin 46 extends transversely from the near end of the carrier 40 for being received within a groove 47 formed in the inner face of the end member 14. This prevents the guide assembly from rotating when the carrier is extended.

In operation, the portion of the fishing line 48 going to the rod is wound around one of the pins 32 in a single loop and then the portion of the line 48 going to the bait is wound around the pins 32 several times (preferably four or five) in a FIG. 8 configuration and is then passed backwardly through the recess 35, around hook 30, forwardly through the recess 35 and through the recess 44. The line then extends downwardly to a hook 50 and sinker. Finally, that portion of the line 48 from the rod is passed forwardly through the recess 44. The magnetic attraction between the magnet 27 and the plate 16 holds the pivot arm in position so that the fishing line is retained on hook 30 and is thereby prevented from moving forwardly and slipping off the ends of the pins 32. When the device has thus been set, it may be lowered into the water along with the downrigger line. Should a fish take the hook 50 the force exerted on the hook 30 will be sufficient to overcome the magnetic attraction between the magnet 27 and the plate 16. As a result, the lever arm 24 will pivot about the axis of the trunnions 22 from its position shown in FIG. 1 to its position shown in Figure 5, thereby releasing the fishing line 48. The fishing line is then pulled from the pins 32 and thereby disengaging from the downrigger release 10.

Those skilled in the art will appreciate that the force necessary to pivot arm 24 will be the product of the attraction force between the magnet 27 and the plate 16 multiplied by the moment arm that this force acts from the axis of the trunnions 22. The longer the moment arm, the greater the required force. Thus, if only a light force is desired for a particular fish, the carrier 26 is positioned close to the axis of trunnions 22 as shown by broken lines in FIG. 1. However, if a greater force is desired, the carrier 26 is positioned outwardly toward the end of the lever 24 as shown by full lines in FIG. 1. In this manner, the release force can be accurately adjusted for use with different fish.

It should also be noted that the force tending to pivot the lever 24 acts in a direction generally normal to the end member 14. The upwardly extending portion of the fishing line 48, however, acts in a direction parallel to the end member 14 and accordingly does not tend to pivot the lever 24 should a force be exerted in the upward direction. In addition, the guide member 43 holds the fishing line 48 away from the end member 14. As a result, should the fish take the hook 50 and move toward the left as shown in FIG. 1, the assembly will release. In the prior art release disclosed in U.S. Pat. No. 4,656,776, the possibility existed that the fishing line would jam against the end of the assembly so that rapid release would not occur and the fish would release the hook.

While only a single embodiment of the invention has been illustrated and described, it is not intended to be limited thereby but only by the scope of the appended claims.

I claim:

1. A downrigger release comprising a body adapted to be attached to an outrigger line and having fishing line receiving means at one end about which a fishing line can be wound,
   first magnetic means mounted on the body and defining a path extending toward and away from the fishing line receiving means,
   lever means pivotally mounted on the body for movement between pivoted and unpivoted positions, said lever means including first and second portions, said first portion extending in a direction parallel to the path and said second portion being positioned adjacent the fishing line receiving means, fishing line engaging means on said second lever portion,
   second magnetic means mounted on the first lever portion for movement to positions thereon adjacent the first magnetic means whereby the magnetic attraction between said magnetic means must be overcome to pivot the lever means from its unpivoted to its pivoted positions with the force required to pivot said lever means being directly related to the position of the second magnetic means along the path so that the pull required to pivot said lever means and thereby release said fishing line can be adjusted for requirements of different fish, and
   guide means mounted on the body and displaced from the one end in a direction opposite to that of the lever means, said guide means having a guide portion for receiving said fishing line thereon so that said line can not be jammed against said body.

2. The downrigger release set forth in claim 1 wherein said guide portion comprises a first guide, a second guide provided on the one end of the body and aligned with the first guide, said first and second guides being constructed and arranged to receive said fishing line therethrough.

3. The downrigger release set forth in claim 2 wherein said first guide includes a member having a recess extending therethrough and a slit formed in its upper end to permit said fishing line to be moved into said recess, said slit being tapered and narrow at its inner end to facilitate insertion of the fishing line but inhibiting the exit thereof through the slit.

4. The downrigger release set forth in claim 3 wherein said second guide comprises a recess extending through the one end of the body and a slit formed in its upper end to permit said fishing line to be moved into said recess, said slit being tapered and narrow at its inner end to facilitate insertion of the fishing line but inhibiting the exit thereof through the slit.

5. The downrigger set forth in claim 4 wherein said guide also includes an elongate carrier slidably mounted on the one end of the body for movement toward and away from the one end and in said opposite direction, said member being disposed at the opposite end of the carrier and with the recess therein in alignment with the recess in one end.

6. The downrigger set forth in claim 5 wherein the carrier extends from the lower portion of the one end, said member extending upwardly from said carrier.

7. The downrigger set forth in claim 6 wherein said fishing line engaging means comprises a hook mounted on the upper portion of the second lever portion and facing toward said first lever portion.

* * * * *